United States Patent
Todorov

(10) Patent No.: US 12,334,060 B2
(45) Date of Patent: Jun. 17, 2025

(54) INTUITIVE DICTATION

(71) Applicant: Orlin Todorov, Sherman Oaks, CA (US)

(72) Inventor: Orlin Todorov, Sherman Oaks, CA (US)

(*) Notice: Subject to any disclaimer, the term of this patent is extended or adjusted under 35 U.S.C. 154(b) by 246 days.

(21) Appl. No.: 18/124,444

(22) Filed: Mar. 21, 2023

(65) Prior Publication Data

US 2023/0306963 A1    Sep. 28, 2023

Related U.S. Application Data

(60) Provisional application No. 63/322,407, filed on Mar. 22, 2022.

(51) Int. Cl.
    *G10L 15/05*    (2013.01)
    *G10L 15/18*    (2013.01)
    *G10L 15/19*    (2013.01)

(52) U.S. Cl.
    CPC ......... *G10L 15/1815* (2013.01); *G10L 15/05* (2013.01); *G10L 15/19* (2013.01)

(58) Field of Classification Search
    CPC ......... G10L 15/26; G10L 15/22; G10L 15/30; G10L 15/05; G10L 15/1815; G10L 15/19; G10L 15/01; G10L 2015/088; G10L 15/04
    USPC ....................................................... 704/255
    See application file for complete search history.

(56) References Cited

U.S. PATENT DOCUMENTS

| | | | |
|---|---|---|---|
| 8,775,175 | B1 | 7/2014 | Nagel et al. |
| 10,043,516 | B2* | 8/2018 | Saddler ................... G06F 3/165 |
| 10,242,669 | B1* | 3/2019 | Sandler ................... G10L 15/22 |
| 11,004,441 | B2 | 5/2021 | Buchanan et al. |
| 11,037,566 | B2 | 6/2021 | Lebeau et al. |
| 11,315,546 | B2* | 4/2022 | Pappu ................... G11B 27/031 |
| 11,418,894 | B2 | 8/2022 | Woodruff et al. |
| 11,790,916 | B2* | 10/2023 | Agarwal ................. G10L 15/26 704/235 |
| 2007/0276649 | A1* | 11/2007 | Schubert ............... G06F 40/157 704/2 |
| 2007/0299664 | A1* | 12/2007 | Peters ..................... G06F 40/16 704/235 |
| 2010/0318355 | A1* | 12/2010 | Li .......................... G10L 15/063 704/244 |

(Continued)

*Primary Examiner* — Vijay B Chawan
(74) *Attorney, Agent, or Firm* — Sandy Lepkin

(57) ABSTRACT

A system and method that can be implemented in, among other things, a computer-implemented method for intuitive dictation without or with minimal use of other input devices besides a microphone, and without or with minimal use of keywords. The method includes receiving speech audio data from a microphone and in response to receiving the audio data, determining automatically whether a transcription of it is intended as a substitution for a fragment of existing text or as new additional text. The method further includes aligning a representation of the speech audio data with the existing text and based on that, determining the likelihood that a transcription of the speech audio data is intended as a replacement of a fragment of existing text and what that fragment is. The method further includes automatically replacing the fragment with the transcription or inserting/appending the transcription, adjusting the final text for proper punctuation and semantics.

25 Claims, 5 Drawing Sheets

(56) References Cited

U.S. PATENT DOCUMENTS

| | | | |
|---|---|---|---|
| 2015/0262581 A1* | 9/2015 | Aleksic | G10L 15/26 |
| | | | 704/235 |
| 2018/0307303 A1* | 10/2018 | Powderly | G06T 19/006 |
| 2018/0315428 A1* | 11/2018 | Johnson | G10L 15/26 |
| 2020/0175961 A1* | 6/2020 | Thomson | G10L 15/28 |
| 2020/0175962 A1* | 6/2020 | Thomson | G10L 15/30 |
| 2021/0241777 A1* | 8/2021 | Bladsy | G10L 17/02 |
| 2022/0115020 A1* | 4/2022 | Bradley | G06F 40/134 |
| 2022/0180862 A1* | 6/2022 | Sharifi | G10L 15/22 |
| 2022/0284904 A1* | 9/2022 | Pu | G06F 40/35 |

* cited by examiner

She participated as a member of the French Olympics team because she told you to give her a good platform for sharing the US experience. Not sure what she thinks now. She thought it would give her
↑
424

↑
422

She participated as a member of the French Olympics team because she thought it would give her a good platform for sharing the US experience. Not sure what she thinks now.
↑
426

*Transcript transcribed and aligned:*     ... Frenč Olimpiks tiim bicouz și told yu to  giv hər a guud plætform ...
                                          ~și pout it wud giv hər~
*Alignment score: 0.58*                   ===== ===-!-!! ========
                                                              ↑
                                                             428

FIG. 4C

432
↓
The forwarder needs to know the details of the import charges. Wants to know
↑
434

The forwarder wants to know the details of the import charges.
↑
436

*Transcript is semantically aligned:*     ðe foruərdər   niidz to nou  ðe deteilz of ðe impoort čarjs.~
                                                        ~uon  ts to nou~
*Semantic similarity score: 0.91*                       +++=--!!========+
*Alignment score: 0.46*

FIG. 4D

INTUITIVE DICTATION

REFERENCE TO PRIOR APPLICATION

This application claims the benefit of provisional patent application 63/322,407 filed Mar. 22, 2022, entitled INTUITIVE DICTATION by Orlin Todorov.

BACKGROUND OF THE INVENTION

Technical Field

The present specification relates to field of dictation, in particular to the editing of text or transcribed speech via speech by one or more computing devices.

Background

Automated speech recognition has made remarkable progress in the past few years, driven by the need to humans to communicate with computer systems, such as automated assistants, search engines, etc, as well as, using computer systems, with other humans. Nevertheless, making dictation via speech recognition as intuitive and easy as speaking is still a challenge.

Even though writing or typing text is significantly more difficult and time-consuming than speaking, people do it, because it is often faster and more convenient for the receiving side to absorb information as text rather than audio. Not only reading is faster than listening, but text is also easier to scan visually, search, and it is cheaper to distribute. One disadvantage of text over speech audio is that it does not convey emotion as well—hence, for instance, the invention of the emoticons. Another is the loss of meaning encoded in prosodic properties of the speech (intonation, stress, pauses)—hence, the invention of punctuation marks.

In addition, text input allows a message creator to make sure that the content of the message is consistent with what she/he wants to communicate before the message being processed by the receiver.

Dictation via automated speech recognition holds the promise to make creating text almost as easy as speaking, but despite many advances over the decades, the technology has yet to live up fully to that promise, especially for dictating longer and more involved texts or for dictating on devices with limited input methods such as touch screen devices, which lack a mouse and a keyboard. A major reason for that is that it is still relatively cumbersome to make edits and corrections to dictated text. The need to make edits arises frequently due to a number of reasons, inherent in communication via speech, including:

to fix involuntary speech lapses and pronunciation errors;
to rephrase something already spoken/dictated;
to fix speech recognition errors, which may be the result of a variety of factors, including audio signal quality affected by distance to microphone and ambient noise, lack of enough context, the user accent, such as non-native accents and health conditions affecting speech;
Text is also often edited to adjust punctuation or formatting.

Current dictation systems rely for such editing primarily on additional input methods besides a microphone, such as a touch screen, a mouse and a virtual or physical keyboard, combined with special graphical user interfaces, as well as on special keywords, keyword structures and voice commands. For example, a mis-transcribed word would have to be selected by the user by tapping on a touch screen and an alternative word selected from a menu, or one or more voice commands would have to be spoken, such as "clear" or "delete". This is not particularly intuitive because it interrupts the natural flow of speech and thought and requires the user to learn and utilize additional input methods, which sometimes may not even be available.

In addition, these current dictation systems' editing methods involve multiple steps in order to performs complex edits, for example they require the steps of selecting and deleting or replacing text fragments, often multiple times, in order to rephrase something. Automatic repunctuation of multi-step edits is also more challenging.

SUMMARY

In general, this document describes editing, via speech input, of text, including dictated text, by one or more computing devices, including a smartphone, a notebook computer or a desktop computer with a built-in or attached microphone. According to an innovative aspect of the subject matter of this specification, a computing device may receive an audio input of an utterance, e.g., spoken by a user, use a speech recognizer to transcribe the utterance and automatically determine whether the transcription is intended as a replacement of a fragment of previously dictated text vs as additional new text to be appended. The device may perform the determination by first aligning the transcription of the utterance with the previously dictated text and based on the alignment score and other properties of the alignment. The device then automatically performs the operation corresponding to the likely user intent, adjusting for the relative cost of guessing wrong. This enables the user to make edits to prior text more intuitively by just speaking the replacement phrase, without having first to select the fragment of text to be replaced using other input methods, such as a touchscreen, mouse or keyboard, and without having to utilize special voice keywords.

In a first aspect, a computer computer-implemented method for intuitive dictation correction includes receiving, by one or more computing devices, speech audio data via a microphone (built-in or attached). The method further includes, executing, by the one or more computing devices, automated speech recognition software to generate a transcription of the utterance. The method further includes determining whether to substitute a transcription of the utterance for a fragment of the first text, to insert the transcription as additional text or to perform another operation, by estimating the likely user intent. The method can further include aligning a transcription of the speech audio data with the existing text or part of it, and based on that, determining the likelihood that the transcription is intended as a replacement of a fragment of existing text and what that fragment is. The method further includes, substituting the transcription for the fragment of existing text, if that is determined to be the most likely user intent. The fragment to be replaced may be briefly highlighted prior to replacement. The method further includes adjusting the final text for proper punctuation, grammar, semantics and formatting after (or simultaneously with) the substitution and insertion operation.

Implementations can include any, all, or none of the following features. The method can include aligning the transcription of the speech audio data and zero or more permutations of its terms with the existing text using sequence alignment, such as global sequence alignment. The method can include aligning the transcription of the speech audio data with the existing text using one or more machine learning models, such a neural network model with attention layers. The method can include jointly transcribing and aligning the speech audio data with parts of the existing text using a machine learning model. The method can include aligning a permutation of the words of the transcription of the speech audio data with the existing text. The method can include aligning the transcription of the speech audio data with the existing text using a combination of sequence alignment, machine learning models and heuristics. The method can include highlighting briefly the fragment of the existing text to be replaced prior to replacing it, to make it easier for the user to verify the edit being made. The highlighting may include an animation of the replacement. The method can include determining explicitly the likelihood that a transcription of the speech audio data is intended as a replacement of a fragment of existing text and comparing the that likelihood with a threshold or a range. The method can include determining implicitly, via heuristic rules, the likelihood that a transcription of the speech audio data is intended as a replacement of a fragment of existing text. The method can include disambiguating between alternative alignments based on determining the semantic similarity of the transcription and the alternative matching fragments. The sequence aligning can include global sequence aligning with added end markers to the sequences and varying match, substitution, insertion and deletion scores based on one or more of: the current, preceding and/or following characters, their character classes, such as word, non-word, punctuation, etc., their respective positions within the sequences, their positions relative to terms in the sequences, such as words, new lines, bullet points, etc., the gap length, the position of a gap within the sequences and/or relative to terms in it, the language of the utterance, the domain of the utterance (i.e. medical, legal, etc.), the history of prior user utterances and actions, the application and device contexts. The method can include further transcribing (converting) the transcription and the part of existing text before aligning them, for example, from an alphabetic to a phonetic representation, in order to improve alignment accuracy. The method can include determining beforehand or jointly, using aligning, rules and/or a neural network, whether a later part of the transcription, possibly delineated by prosodic features, is intended as a replacement of an earlier part of it, and if so, replacing the earlier part with the later part. The earlier and later parts the transcription corresponding to earlier and later parts of the speech audio. The segmentation of the transcription can be based on prosodic feature of the speech audio, such as pauses, and/or grammatical features such as likely clause boundaries or relative repetition boundaries. Determining the likelihood of intent to replace existing text with a transcription of the speech audio data can be based on the length of the matched segments of the transcription and the text, the length of the transcription of the utterance in terms of characters and/or words, the distance in terms of a characters, phonemes, words, sentences, paragraphs from the caret position in the text, the context around the caret position in the text (such as whether it is after an end-of-sentence mark), the semantic similarity between the aligned segments, the likelihood that the preceding text is a complete sentence, and other features of the utterance, its transcription, and the first text. Thus, a one-word transcription of an utterance, with the caret at the end of a paragraph, all other things being equal, is more likely to be intended as an edit/correction. Similarly, an edit/correction is more likely to be needed in the part of the existing text corresponding to the immediately previous utterance, than in other parts. The method can include removing a keyword from the transcription before determining whether the rest of the transcription is intended as a replacement of a fragment of existing text and what that fragment is. The method can include choosing one of several alternative transcripts with which to replace a fragment of the existing text based on grammatical and semantic fit with the surrounding text. The method can include, after replacing a fragment of existing text, adjusting the resulting text to clean up any adjacent word repetitions and for proper punctuation, grammar and semantics using rules and/or machine learning models, such as a multi-lingual neural network model with attention layers, fine-tuned for punctuation.

In a second aspect a computer program product, encoded on a computer-readable medium, operable to cause one or more processors to perform operations for intuitive dictation, the operations include receiving speech audio data from a microphone of a computing device (built-in or attached). The operations further include, sending the speech audio data to a local (on the device) or a remote transcription system, possibly together with fragments of existing text around the caret position in a text field, and obtaining a transcription of the speech audio data. The operations further include aligning a transcription of the speech audio data with the existing text or part of it, and based on that, determining the likelihood that the transcription is intended as a replacement of a fragment of existing text or as an insertion as additional new text. The operations further include, substituting the transcription for a fragment of existing text, if the likelihood of that intent is determined to be above a threshold or appending/inserting the transcription to the existing text. The computer program product and its operations can be distributed across several computer-readable mediums and computing devices connected via a network.

Implementations can include any, all, or none of the following features. The operations can include aligning the transcription of the speech audio data with the existing text using one or more machine learning models, such a neural network model with attention layers. The operations can include jointly transcribing and aligning the speech audio data with parts of the existing text using a machine learning model. The operations can include aligning a permutation of the words of the transcription of the speech audio data with the existing text. The operations can include aligning the transcription of the speech audio data with the existing text using a combination of sequence alignment, machine learning models and heuristics. The operations can include highlighting briefly the fragment of the existing text to be replaced before replacing it, to make it easier for the user to verify the edit being made. The operations can include determining explicitly or implicitly the likelihood that a transcription of the speech audio data is intended as a replacement of a fragment of existing text. The operations can include disambiguating between alternative alignments based on determining the semantic similarity of the transcription and the alternative aligned segments. The sequence aligning can include global sequence aligning using varying match, substitution, insertion and deletion scores based on one or more of: the current, preceding and/or following characters, their character classes, such as word, non-word, punctuation, etc., their respective positions within the sequences, their positions relative to terms in the sequences, such as words, new lines, bullet points, etc., the gap length, the position of a gap within the sequences and/or relative to terms in it, the language of the utterance, the domain of the utterance (i.e. medical, legal, driving, etc.), the history of prior user utterances and actions, the application and device contexts. Thus, for example, insertion and deletion scores can be affine beyond the first and last words, towards the middle of the match, to enable easy deletion or insertion of words without sacrificing discriminatory power. Also for example, the deletion scores can be higher than average for end-of-sentence marks to avoid unintendedly replacing the tail of the last sentence with the head of the new sentence. Vowel-for-vowel substitution scores can be lower on average than vowel-for-consonant. Match scores for initial phrase characters can be higher to reduce risk of overextension. Insertion scores just before the start of a previous transcription can be lower to enable correcting for missed words by the speech recognizer. The operations can include further transcribing (converting) the transcription and the part of existing text before aligning them, for example, from an orthographic to a more phonetic representation, in order to improve alignment accuracy. The operations can include determining beforehand or jointly, using aligning, rules and/or a neural network, whether a later part of the transcription, possibly delineated by prosodic features, is intended as a replacement of an earlier part of it, and if so, replacing the earlier part with the later part. The earlier and later parts the transcription corresponding to earlier and later parts of the speech audio. The segmentation of the transcription can be based on prosodic feature of the speech audio, such as pauses, and/or grammatical features such as likely clause boundaries or relative repetition boundaries. Determining the likelihood of intent to replace existing text with a transcription of the speech audio data can be based on the length of the matched segments of the transcription and the text, the length of the transcription of the utterance in terms of characters and/or words, the distance in terms of a characters, phonemes, words, sentences, paragraphs from the caret position in the text, the context around the caret position in the text (such as whether it is after an end-of-sentence mark), the semantic similarity between the aligned segments, the likelihood that the preceding text is a complete sentence, and other features of the utterance, its transcription, and the first text. Thus, a one-word transcription of an utterance, at the end of a paragraph, all other things being equal, is more likely to be an edit/correction. Similarly, an edit/correction is more likely to be needed in the part of the existing text corresponding to an immediately previous utterance, than in other parts. The operations can include removing a keyword from the transcription before determining whether the rest of the transcription is intended as a replacement of a fragment of existing text and what that fragment is. The operations can include choosing one of several alternative transcripts with which to replace a fragment of the existing text based on grammatical and semantic fit with the surrounding text. The method can include, after replacing a fragment of existing text, adjusting the resulting text to clean up any adjacent word repetitions and for proper punctuation, grammar and semantics using rules and/or machine learning models, such as a multi-lingual neural network model with attention layers, fine-tuned for punctuation.

The transcription of the speech audio data can include various representations of it, such as lattices, phonemic, orthographic, byte, discrete units, etc.

The systems and techniques described in this specification may provide one or more of the following advantages. First, a system can enable easier and faster dictation by allowing for sophisticated edits and corrections to text to be performed intuitively, often in a single step, without or with minimal use of other input methods besides a microphone and without or with minimal use of keywords or keyword structures as hints. Second, a system can make continuous speech auto-correction possible and intuitive, enabling a user to make corrections within the same utterance, including adjacent and long-range changes. Third, a system can improve dictated text quality by reducing the need for manual text edits and typos, as well as by auto-repunctuating edited sentences. Fourth, by enabling faster dictation, a system has the potential to reduce power consumption of the user device.

The details of one or more implementations are set forth in the accompanying drawings and the description below. Other features and advantages will be apparent from the description and drawings, and from the claims.

Prior art that has some basic relevance to this invention includes U.S. Pat. No. 11,004,441—"Speech Endpointing based on word comparisons", which also involves guessing a user intent during dictation, and U.S. Pat. No. 11,037, 566—"Word-level correction of speech input", which also involves correction of dictated text, but via manual input methods and graphical user interfaces.

The basic embodiment of the present invention teaches a computer-implemented method comprising the steps of: presenting, by one or more computing devices, in a region of a display of a computing device, some first text; receiving, by the one or more computing devices, audio data of an utterance; and responding; executing, by the one or more computing devices, automated speech recognition (ASR) software to generate a transcription of the utterance; determining, by the one or more computing devices, whether to substitute a transcription of the utterance for a fragment of the first text, to insert the transcription as additional text or to perform another operation; responding to the determining whether to substitute the transcription of the utterance for an unselected fragment of the first text, to insert the transcription as additional text or to perform another operation, presenting by the one or more computing devices, in the region of the display of the computing device, a second text, wherein the second text further comprises the transcription of the utterance either automatically substituted for the fragment of the first text, or else, inserted as additional text, or transformed into another modification of the first text, or no modification, wherein a portion of the second text around the substituted with or inserted transcription of the utterance, is optionally further adjusted for proper punctuation, word repetition, grammar and semantics, wherein the fragment of the first text to be replaced is optionally highlighted briefly prior to presenting the second text.

The above embodiment can be further modified by defining that the step of determining whether to substitute the transcription of the utterance for the fragment of the first text, to insert the transcription as additional text or to perform another operation, further comprises determining explicitly or implicitly a likelihood that a transcription of the utterance is intended by a user as a replacement of the fragment of the first text and what the fragment is, and determining whether the likelihood satisfies an absolute or relative threshold level or a range.

The above embodiment can be further modified by defining that there is a further step of determining the likelihood that a transcription of the utterance is intended as a replacement of the fragment of the first text comprises aligning a transcription of the utterance and zero or more permutations of its terms with the first text and is based on the alignment scores, and on zero or more internal and external properties of the alignments, including the following: the length and position, in terms of characters, words, sentences or paragraphs, of the matching fragments of the transcription of the utterance and the first text; the context around a caret position, such as whether the caret is after an end-of-sentence mark; the type of characters and words in the aligned fragments; the alignment scores of sub-fragments of matched fragments; the semantic similarity of the matching fragments, possibly including adjacent and excluding end words, determined using a neural network model such as a multilingual deep neural network model with attention layers finetuned on a semantic similarity task.

The above embodiment can be further modified by defining that there is a further step of aligning a transcription of the utterance with the first text comprises aligning a transcription of the utterance with one or more parts of the first text using sequence alignment, such as global sequence alignment with start and end markers added to the transcription beforehand.

The above embodiment can be further modified by defining that there is a further step of the sequence alignment insertion, deletion, match and mismatch scores can vary based on one or more of the following: the value of the current, preceding and/or following characters, their character classes (word, non-word, punctuation, marker, etc.), their positions within the sequences, including relative to terms in the sequences, gap length, the language and domain of the utterance, the history of prior utterances and actions, and the application and device contexts.

The above embodiment can be further modified by defining that there is a further step of the transcription and the part of the first text to be aligned are further transcribed before aligning.

The above embodiment can be further modified by defining that there is a further step of the permutation of the transcription is generated by comparing the terms of the transcription with the terms of first text or part of it, including by global sequence aligning the terms of the transcription with the first text or part of it and taking into account the order of the matched terms in the first text.

The above embodiment can be further modified by defining that there is a further step of in response to receiving the audio data of the utterance, detecting by the one or more computing device whether the utterance is an "undo replacement" type voice command and in response to detecting such command, presenting a second text comprised of the text before the replacement, but with the transcription of the previous utterance inserted into it as additional text.

The above embodiment can be further modified by defining that there is a further step of determining, by the one or more computing devices, whether to substitute a transcription of the utterance for a fragment of the first text, to insert the transcription as additional text or to perform another operation further comprises determining whether a part of the utterance is intended as a replacement of an earlier spoken part of it and in response to determining that it is, substituting the corresponding later part of the utterance transcription for the corresponding earlier part of it, wherein determining whether a part of the utterance is intended as a replacement of an earlier spoken part of it comprises one or both of the following: aligning at least one part of the utterance transcription with another part using sequence alignment and applying a set of regular expression replacement rules to the transcription of the utterance.

The above embodiment can be further modified by defining that there is a further step of determining whether to substitute a transcription of the utterance for a fragment of the first text further comprises determining, by one or more computing devices, whether to substitute a transcription of the utterance for a fragment of the first text using a neural network model, configured to generate a fragment of the second text that includes the substituted with or inserted transcription of the utterance, based on the audio data of the utterance or its transcription and a portion of the first text around the caret position, such as such as multilingual transformer model, trained or finetuned on the task of editing via dictation using real and/or synthesized examples.

The above embodiment can be further modified by defining that there is a further step of aligning a transcription of the utterance with a part the first text comprises aligning a transcription of the utterance with a part of the first text using a neural network alignment model.

The above embodiment can be further modified by defining that there is a further step of adjusting a portion of the second text around the substituted with or inserted transcription of the utterance for proper punctuation, grammar and semantics comprises one or both of the following: processing by the one or more computing devices, that portion of the second text using a deep neural network model, such as a multilingual transformer model, fine-tuned for predicting punctuation; processing by the one or more computing devices, that portion of the second text using a set of regular expression replacement rules, with markers denoting the boundaries of the substituted with or inserted transcription of the utterance.

An alternate embodiment of the instant invention teaches a system of intuitive dictation comprising: one or more computers and one or more storage devices storing instruction that are operable, when executed by the one or more computers, to cause the one or more computers to perform operations, the operations further comprising: presenting, by one or more computing devices, in a region of a display of a computing device, some first text; receiving, by the one or more computing devices, audio data of an utterance; and executing, by the one or more computing devices, automated speech recognition (ASR) software to generate a transcription of the utterance; determining, by the one or more computing devices, whether to substitute a transcription of the utterance for a fragment of the first text, to insert the transcription as additional text or to perform another operation; responding by determining whether to substitute a transcription of the utterance for an unselected fragment of the first text, to insert the transcription as additional text or to perform another operation, presenting by the one or more computing devices, in the region of the display of a computing device, a second text, wherein the second text comprises the transcription of the utterance either automatically substituted for the fragment of the first text, or else, inserted as additional text, or transformed into another modification of the first text, or no modification, wherein a portion of the second text around the substituted with or inserted transcription of the utterance, is optionally further adjusted for proper punctuation, word repetition, grammar and semantics, wherein the fragment of the first text to be replaced is optionally highlighted briefly prior to presenting the second text.

The above embodiment can be further modified by defining that there is a further step of determining whether to substitute a transcription of the utterance for a fragment of the first text, to insert the transcription as additional text or to perform another operation, comprises determining explicitly or implicitly a likelihood that a transcription of the utterance is intended by a user as a replacement of the fragment of the first text and what the fragment is, and determining whether the likelihood satisfies an absolute or relative threshold level or a range.

The above embodiment can be further modified by defining that there is a further step of determining the likelihood that a transcription of the utterance is intended as a replacement of a fragment of the first text comprises aligning a transcription of the utterance and zero or more permutations of its terms with the first text and is based on the alignment scores, and on zero or more internal and external properties of the alignments, including the following: the length and position, in terms of characters, words, sentences or paragraphs, of the matching fragments of the transcription of the utterance and the first text; the context around the caret position, such as whether the caret is after an end-of-sentence mark; the type of characters and words in the aligned fragments; the alignment scores of sub-fragments of the matched fragments; the semantic similarity of the matching fragments, possibly including adjacent and excluding end words, determined using a neural network model such as a multilingual deep neural network model with attention layers finetuned on a semantic similarity task.

The above embodiment can be further modified by defining that there is a further step of aligning a transcription of the utterance with the first text comprises aligning a transcription of the utterance with one or more parts of the first text using sequence alignment, such as global sequence alignment with start and end markers added to the transcription beforehand.

The above embodiment can be further modified by defining that there is a further step of the sequence alignment insertion, deletion, match and mismatch scores can vary based on one or more of the following: the value of the current, preceding and/or following characters, their character classes (word, non-word, punctuation, marker, etc.), their positions within the sequences, including relative to terms in the sequences, gap length, the language and domain of the utterance, the history of prior utterances and actions, and the application and device contexts.

The above embodiment can be further modified by defining that there is a further step of the transcription and the part of the first text to be aligned are further transcribed before aligning.

The above embodiment can be further modified by defining that there is a further step of the permutation of the transcription is generated by comparing the terms of the transcription with the terms of first text or part of it, including by global sequence aligning the terms of the transcription with the first text or part of it and taking into account the order of the matched terms in the first text.

The above embodiment can be further modified by defining that there is a further step of in response receiving the audio data of the utterance, detecting by the one or more computing device whether the utterance is an "undo replacement" type voice command and in response to detecting such command, presenting a second text comprised of the text before the replacement, but with the transcription of the previous utterance inserted into it as additional text.

The above embodiment can be further modified by defining that there is a further step of determining, by the one or more computing devices, whether to substitute a transcription of the utterance for a fragment of the first text, to insert the transcription as additional text or to perform another operation further comprises determining whether a part of the utterance is intended as a replacement of an earlier spoken part of it and in response to determining that it is, substituting the corresponding later part of the utterance transcription for the corresponding earlier part of it, wherein determining whether a part of the utterance is intended as a replacement of an earlier spoken part of it comprises one or both of the following: aligning at least one part of the utterance transcription with another part using sequence alignment and applying a set of regular expression replacement rules to the transcription of the utterance.

The above embodiment can be further modified by defining that there is a further step of determining whether to substitute a transcription of the utterance for a fragment of the first text comprises determining, by one or more computing devices, whether to substitute a transcription of the utterance for a fragment of the first text using a neural network model, configured to generate a fragment of the second text that includes the substituted with or inserted transcription of the utterance, based on the audio data of the utterance or its transcription and a portion of the first text around the caret position, such as such as multilingual transformer model, trained or finetuned on the task of editing via dictation using real and/or synthesized examples.

The above embodiment can be further modified by defining that there is a further step of aligning a transcription of the utterance with a part the first text comprises aligning a transcription of the utterance with a part of the first text using a neural network alignment model.

The above embodiment can be further modified by defining that there is a further step of adjusting a portion of the second text around the substituted with or inserted transcription of the utterance for proper punctuation, grammar and semantics comprises one or both of the following: processing by the one or more computing devices, that portion of the second text using a deep neural network model, such as a multilingual transformer model, fine-tuned for predicting punctuation; processing by the one or more computing devices, that portion of the second text using a set of regular expression replacement rules, with markers denoting the boundaries of the substituted with or inserted transcription of the utterance.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 4A-D are examples of alignments of a transcription of an utterance with previous text for intuitive text editing via dictation.

DETAILED DESCRIPTION

Figure 1:
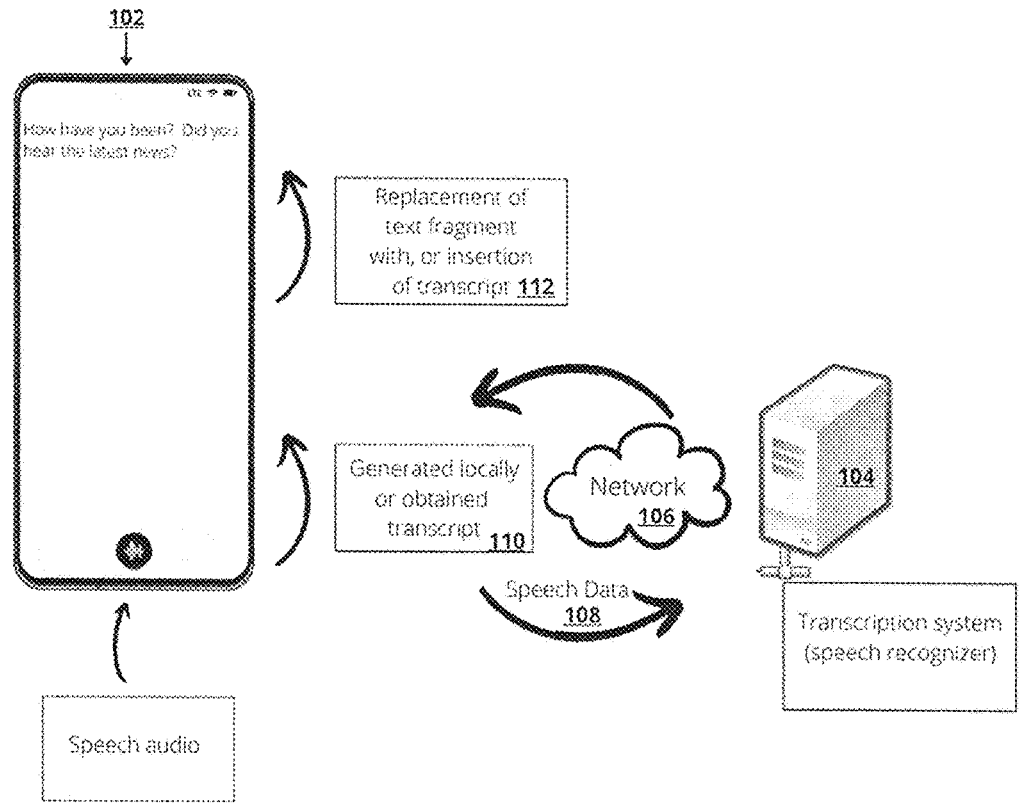
FIG. 1 is a schematic diagram that shows an example of a system 100 for intuitive dictation.

Turning to the drawings, the preferred embodiment is illustrated and described by reference characters that denote similar elements throughout the several views of the instant invention.

FIG. 1 is a schematic diagram that shows an example of a system 100 for intuitive dictation. The system enables a computing device 102, which may be a smartphone, laptop, desktop, etc., to receive audio data of speech 108 and to determine automatically whether the transcription of the speech is intended to replace of a fragment of existing text or to be added as new text, and to perform the corresponding operation, thus enabling the user to dictate and edit via dictation intuitively without having to perform cumbersome additional actions using supplementary input methods, such as tapping on a touchscreen, clicking and dragging with a mouse, typing with a keyboard, using special voice keyword structures, etc.

The system 100 includes a computing device optionally in communication with a transcription system 104 via a network 106. The device receives speech audio input from a user, converts it to digital speech data output 110, which it sends to a speech recognizer software that runs locally on the device or to a remote transcription system 104 over the network 106, and obtains from either of those a transcription 112 of the speech data 110. The device then determines whether the transcription was intended as a replacement of a fragment of previous text or as a new addition to the text. In response to determining that, it either replaces the corresponding fragment of text or inserts/appends the transcription at the caret position and presents the resulting text on the device's display.

In some implementations the computing device 102 highlights the fragment of text briefly before replacing it. The period of highlighting may depend on the length of the text fragment and/or its distance from the caret position.

In some implementations the computing device 102 evaluates also the likelihood that the user the a voice command to undo a previous automatic replacement and insert the replacement transcription as new text instead.

In some implementation the computing device 102 accesses the network via a wireless connection or wireline connection that can be used to send and receive data from a transcription system which includes a speech recognizer.

Figure 2:
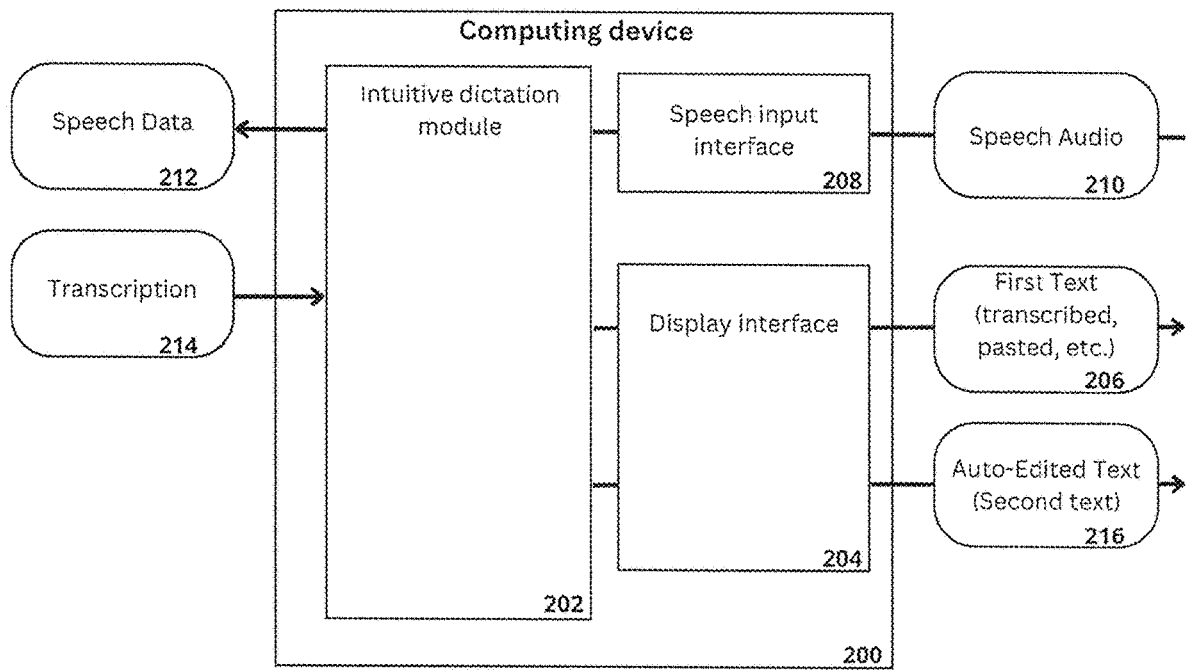
FIG. 2 is a block diagram that shows an example of a computing device 200 for intuitive dictation.

FIG. 2 is a block diagram that shows an example of a computing device 200 for intuitive dictation. The computing device 200 includes an intuitive dictation module 202 that is responsible for presenting text transcribed from a user utterance and for performing auto-edits of previous text on the basis of the utterance and its transcription. These edits include text fragment substitutions or insertions of the transcription. In particular, the computing device 200 includes a speech input interface 208 that receives a speech audio input 210 from the user. For example, the speech input interface 208 can be a microphone that converts the sounds of the utterance from the user into a speech data 212. The speech input interface passes the speech data output 210 to the intuitive dictation module, which sends it further to a local or remote speech recognizer system.

The speech recognizer system performs a speech recognition operation on the speech data 212 to generate a transcription 214, which is passed to the computing device. The intuitive dictation module 202 receives the transcription 214 and determines whether it was intended to substitute existing text fragment or to be inserted or appended as new text. The intuitive dictation module then performs the corresponding operation and presents the resulting text in a display interface 204. In some implementations, the display interface 204 is a hardware display screen such as an LCD or OLED screen.

In some implementations, the intuitive dictation module can pass to the speech recognizer system additional data such as a portion of the displayed text to the left and/or right of the carat position. The speech data can also be passed directly to the speech recognizer and its transcription received by the intuitive dictation module.

In some implementations, the intuitive dictation module can be distributed across several computing devices connected via a network, each performing specific operations, such as determining the likelihood of a substitution intent or repunctuating an auto-edited sentence. An auto-edited sentence may be a sentence containing the transcript either as substitution or insertion.

Figure 3A:
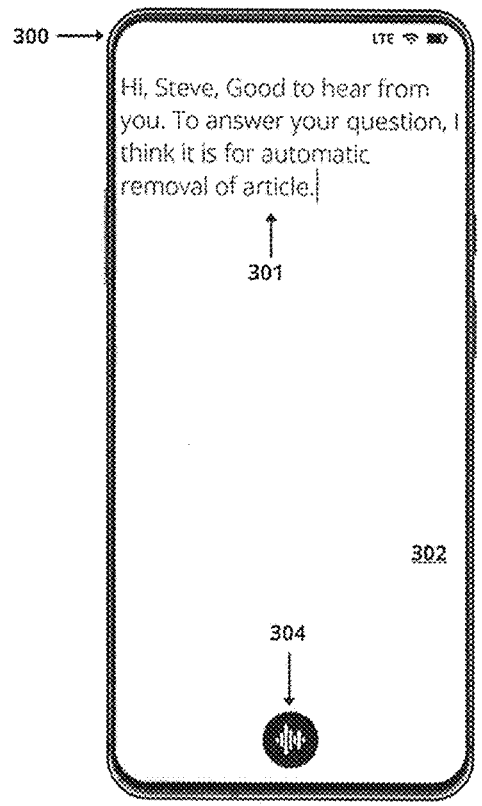
FIG. 3A-D are examples of graphical user interfaces (GUIs) for intuitive dictation.

FIG. 3A is an example of a GUI 300 for intuitive dictation. The GUI 300 may be associated with an application that receives text input, such as an instant message application, an email application, a word processor application, a search engine or an automated (AI) agent. The GUI 300 includes a text input area 302 and a microphone toggle button 304 to initiate or stop speech-to-text input into the text input area. The microphone button shows an indicator that the system is currently ON—listening for audio input.

The GUI 300 presents in the text input area 302 the first text 301 "Hi, Steve, How are you? To answer your question, I think it is for automatic removal of article.", which may have been dictated in one or more utterances by user, where the last word "article" is a mis-transcription of the actually spoken word "artifacts". That is, the user meant to input the sentence "I think it is for automatic removal of artifacts". The user sees the mistake and wants to correct it, but also decides at the same time to rephrase the sentence to "I think it is to remove artifacts automatically" which sounds better to her/him. The user can both fix the mis-transcription and rephrase the sentence by just speaking anew the part of the sentence that she/he wants to change—"it is to remove artifacts automatically".

Figure 3B:
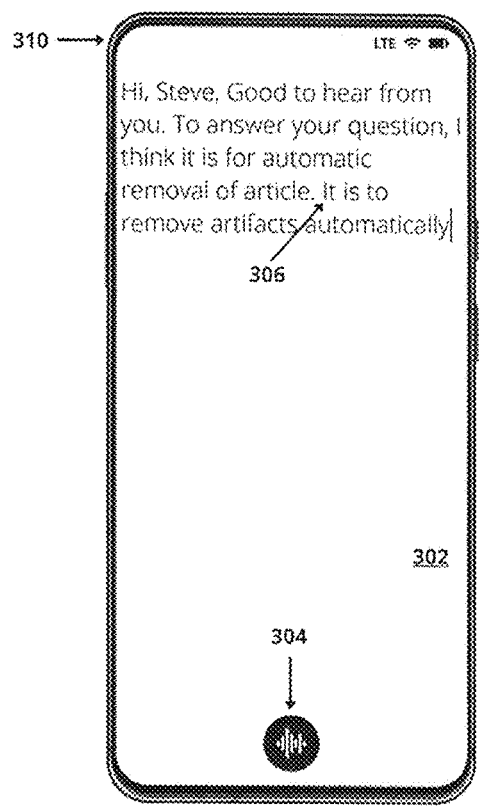

FIG. 3B is an example of a GUI 310 for intuitive dictation. The GUI 310 presents the transcription of the rephrasing 306 "it is to remove artifacts automatically" as it is being spoken in real time, inserted in the text input area 302, at the caret position.

Figure 3C:
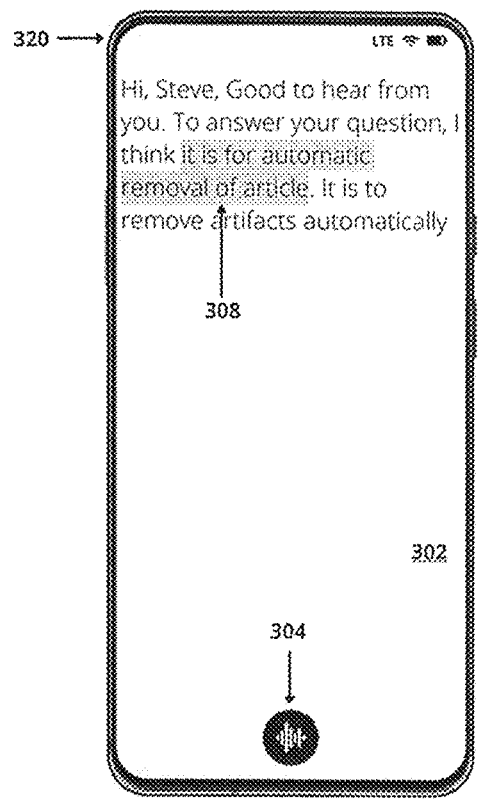

FIG. 3C is an example of a GUI 320 for intuitive dictation. In response to the system determining that the likely user intent is to rephrase a text fragment from the first text 301 (FIG. 3A), the GUI 320 presents the first text with the fragment to be replaced 308 by the new phrase 306 highlighted briefly. In some implementations the period of time may vary based on the type of edit, the length of the fragment 308, its distance from the caret position or other factors. Longer fragments as well as those further away from the caret position may need to be highlighted longer, to allow the user to better follow what is happening. In some implementations the determination whether to replace a fragment of the first text and what that fragment is done when the utterance is marked as complete (end-pointed) by the speech recognizer. In other implementations it can be done optimistically before that. In some implementations the utterance can be end-pointed based in part on determining whether it is likely intended as a substitution.

Figure 3D:
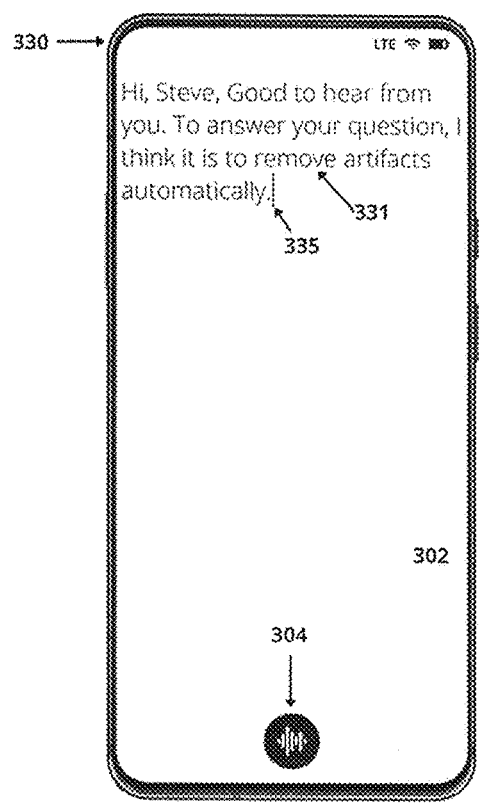

FIG. 3D is an example of a GUI 330 for intuitive dictation. After the highlight period has expired, the system has updated the GUI to show the second text 301 where the new phrase 306 (FIG. 3B) has been substituted for the fragment 308 (FIG. 3C) of the first text 301 (FIG. 3A). The caret 335 relative position is restored, so that the user can readily continue dictation with the next sentence.

In some implementations, in response to determining that the user intent is not to replace an existing text fragment but to insert or append the transcription as new text, the system may still replace or delete adjacent words, and/or characters from the first text around the insertion point, in order to remove duplicate words or in order to synchronize grammatically the inserted fragment with the old text. In those cases, highlighting of the fragments being adjusted may not be needed.

In some implementations, the text being edited may not be presented by a GUI, or there may not be a GUI at all, while dictation and the edits are still being performed using the method. In some implementations, the text being edited and the speech transcripts may be read back to the user instead, or presented to him in other ways, or not presented all. In some scenarios of dictating, such as of shorter passages of text, it may be appropriate allow for automatic editing using the subject system of this specification without displaying or otherwise presenting the text being edited at all.

FIGS. 4A-D show examples of alignments of a transcription with previous text determined by embodiments of the system for intuitive dictation.

Figure 4A:
Figure 4A:
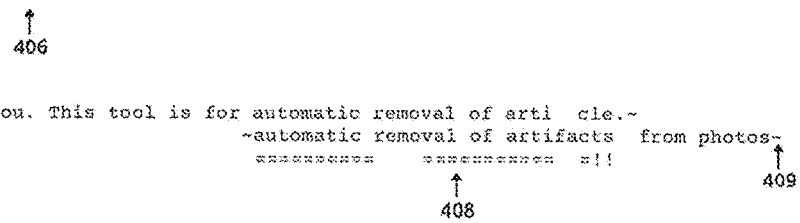

FIG. 4A shows an example of an alignment 408. In this case the user stopped midsentence because she noticed that she mis-spoke—instead of saying "removal of artifacts", she the "remover of artifacts", and in addition, the speech recognizer misheard and mis-transcribed "artifacts" as "art effects". This resulted in the first text 412. The user then decided to fix those errors and complete the sentence, all in one step, by just dictating "removal of artifacts from portrait photos", which was transcribed correctly (414). An embodiment of the system for intuitive dictation then aligns the last transcription with the first text using character-based global sequence alignment, after first adding start and end markers 409 to the transcription and an end marker to the first text. In the resulting alignment, the fragment "remover of art effects." at the end of the previous sentence happens to match the starting portion of the transcription—"removal of artifacts". Based in part on the high alignment score, the system determines that it is most likely and likely enough that the user's intent is to replace the old fragment with the new transcription and produces the second text 416. The start and end markers 409 aid in, among other things, aligning the transcription with first text at word boundaries and avoiding over-extension or under-extension, by having variable insertion, deletion, match and mismatch scores, based on the type of characters in the first text 412. The alignment score can be determined in a general way for example by taking the ratio of the global sequence alignment score (adjusted for end markers insertion costs) and the length of the matched fragment of the transcript. Determining that the likelihood of the user intent satisfies a threshold level or range includes determining that implicitly via heuristic rules based on the alignment score and other properties of the alignment, transcript and first text. The threshold level or range can be relative to the likelihoods of other user intents. Thus, the relative cost the modifications to the text corresponding to the different operations can also be taken into account. Sometimes the most likely user intent may be substitution, but the difference in likelihood not enough to warrant the higher cost of guessing wrong the rarer operation and undoing it.

In some implementations, the global sequence alignment can be performed using a Needleman-Wunsch-type algorithm. In some implementations, the insertion, deletion and substitution scores can vary based on the type of characters, their positions and other properties. For example, in some implementations, the end-of-sentence mark deletion score could be higher in order to favor intra-sentence alignments because intentional auto-edits across sentence boundaries are less common, as well as to prevent unintended replacement of the last words of the previous sentence with the first words of the next sentence. As another example, substitution scores for characters denoting similarly sounding phonemes such as f→p, e→i, o→a, etc. could be lower. As a still another example, in some implementations the deletion and insertion costs could be afine in the middle of the aligned strings, to give relatively more weight to matching the words at the ends of the transcription.

Figure 4B:
Figure 4B:
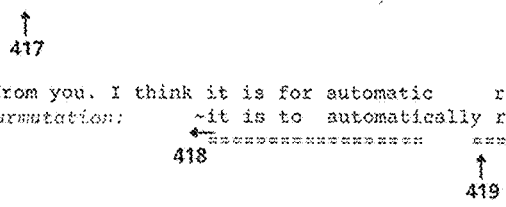

FIG. 4B shows another example of an alignment 419 of a transcription 414 "it is to remove artifacts automatically" with first text 412 "Hi, Steve. Good to hear from you. I think it is for automatic removal of article.". Based on this alignment and its alignment score 420, an embodiment of the system can determine that the user intends to rephrase the fragment 416 "it is for automatic removal of article" in the first text with the transcription 414 "it is to remove artifacts automatically", in order to produce the second text 417. In some implementations of the system for intuitive dictation, the transcription 414 "it is to remove artifacts automatically" is first permuted to "it is to automatically remove artifacts" (418) and the permutation aligned using character-based global sequence alignment, while the final alignment score is based on both a permutation score and the sequence alignment score. In some implementations, the appropriate permutation of the transcription to be aligned, can be determined based on aligning the transcription terms and sub-phrases with the first text, preferring alignments to terms in the previous text that are close together. This example corresponds roughly to the UI examples in FIG. 3A-3D.

FIG. 4C shows yet another alignment example. In this case presumably the user spoke " . . . she thought it would give her . . . experience", but the speech recognizer misheard and mis-transcribed the utterance as " . . . she told you to give her . . . experience". The user then attempts to correct the error by speaking again the phrase 424 "she thought it would give her". In some implementations, as in this case, both the transcription and the first text are further transcribed phonetically prior to aligning. In this way the character-based sequence alignment is more phonetic, instead of alphabetic. This helps in particular with finding and correcting speech-recognition and pronunciation mistakes. In the above example, the word "thought", for instance, is transcribed phonetically to "$p$ out", which, as a character sequence is closer to "told". Phonetic or phonemic transcriptions can improve the accuracy of finding misheard phrases in the text using sequence alignment, especially for some languages, such as English and French, with very complex orthography, where often similarly sounding words are spelled very differently. Still other languages, in particular Indic ones, are usually written with scripts, such as Devangari, where a single letter may represent a combination of a consonant and a vowel.

FIG. 4D show a rephrasing example, in which alignment is based in part on determining the semantic similarity of text fragments. Here the user dictated the phrase 434 "wants to know" intending for it to replace the phrase 432 "needs to know" in the sentence "The forwarder needs to know the details of the import charges." An embodiment of the system can sequence-align phonemically transcribed versions of the phrase 434 with the previous text and determine that the matched text fragment in the previous text is not phonemically similar enough, but determine using a machine learning model that it is semantically similar enough to warrant its substitution. Determining whether to substitute or not and which fragment of the previous text to replace can involve additional considerations and properties of the aligned segments, as described before.

In some implementations, the semantic similarity may be determined by a multi-lingual transformer neural network model, fine-tuned on a semantic similarity task, running either locally, on the device or remotely, on a server connected via a network to the device.

In some implementations the intuitive dictation module handles 'Undo', 'Redo', and 'Undo replacement' operations triggered by voice commands or keyboard shortcuts. In some implementations, in order to provide for easier undoing of unintended replacements of previous text with the latest transcription, the intuitive dictation module can recognize a 'Undo replacement' voice command. In response to detecting that command, the intuitive dictation module can revert the replacement and append the corresponding transcription as new additional text instead. While in response to just the 'Undo' command spoken after a replacement, the intuitive dictation module would undo the replacement, but not append the transcription. This allows the user to attempt the replacement again more easily.

Figure 5:
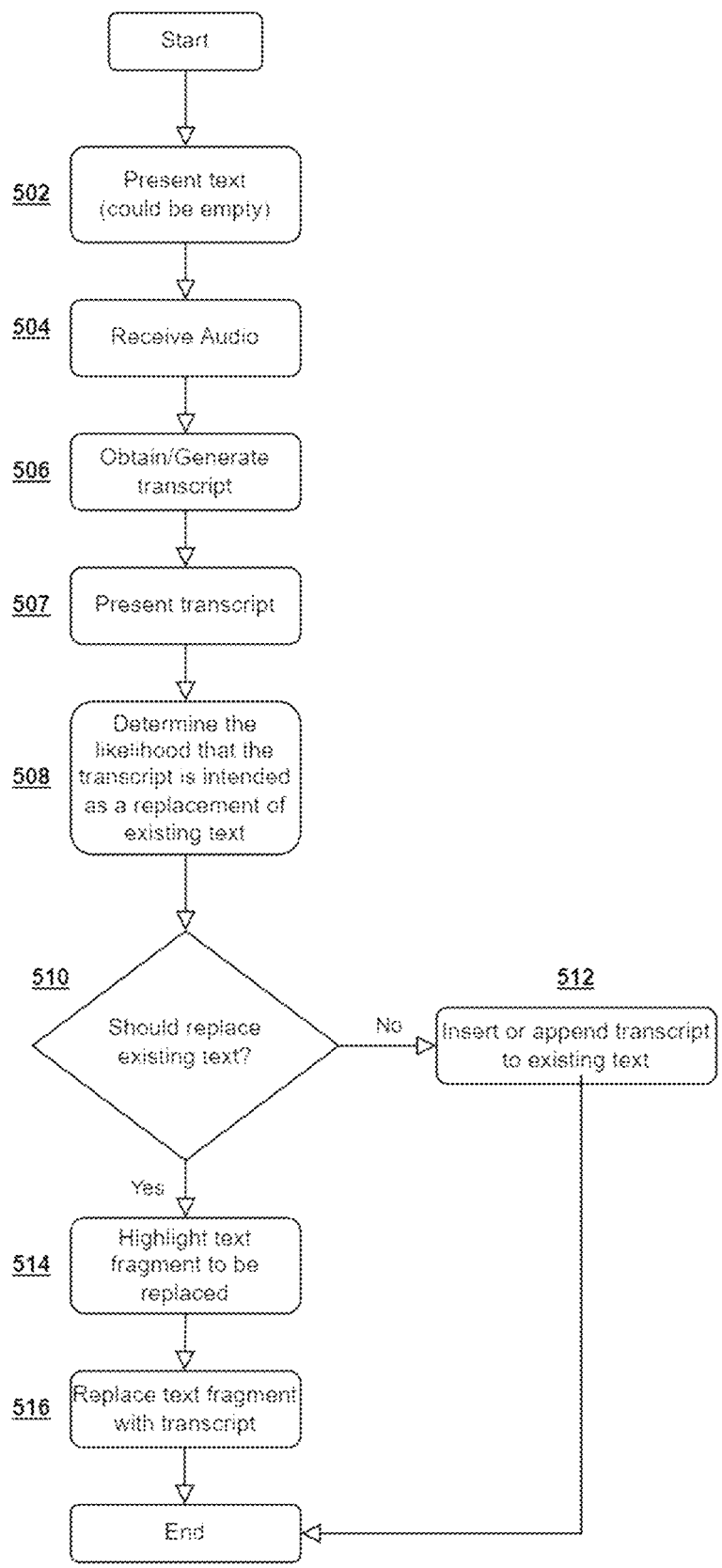
FIG. 5 is a flow chart that shows and example of a process for intuitive dictation.

FIG. 5 is a flow chart that shows an example of a process 500 for intuitive dictation. The process 500 may be performed for example by a system such as the system 100, the computing device 200, and/or the GUIs 300, 310, 320, 330, 340 as the basis of examples for describing the process 500. However, another system, or combination of systems, may be used to perform the process 500.

The process 500 begins with presenting some text 502 on the display screen of the computing device, which may be the result of previous iterations of the process 500, or an empty string. For example, it may present the text 301 in the text input area 302 of the GUI 300, presumably the result of previous dictation.

The process 500 then receives (504) speech audio data from a microphone attached to or part of a computing device. For example, a user may input an utterance into a microphone on a smartphone or laptop, into an earphone connected wirelessly to a smartphone or into an external microphone attached via a cable to a desktop computer.

The process 500 obtains or generates (506) a transcription of the speech audio data. It may, for example, obtain it from a remote transcription system 104 accessible via a network 106 by sending the speech data 108 to it and receiving back the transcription, or it can generate it using a speech recognizer running locally on the device 200.

The process 500 may present the transcription on the display screen of the computing device. For example, it may present the transcribed text 306 in the text input area 302 in the GUI 310.

The process 500 then determines (508) the likelihood that the transcription is intended as a replacement of previous text or as something else and based on that determines (510) whether to replace existing text with it, to insert it as new text, or to perform another action, such as executing a voice command.

If the process 500 determines that the transcription should replace existing text, it may highlight (514) the fragment of the previous text to be replaced for a period of time before replacing it (516) with the transcription of the speech audio data. For example, it may highlight the text fragment to be replaced 308 in the GUI 320.

If the process 500 determines based on the likelihood that the transcription is intended as a replacement of previous text, inserted as new text or interpreted as a voice command, that it should be inserted as new text, it inserts (512) the transcription as new text, for example at the caret position in the text input area of the GUI.

In some implementations there can be voice commands, such as an 'Undo' voice command to undo a previous iteration of the steps 507-516 and an 'Undo replacement' type voice command, which undoes the previous replacement of a fragment of existing text (steps 514-516) and instead inserts the transcription as new text (512).

As noted above, insertion of the transcription as additional new text (instead of replacement) may also involve adjustments around the insertion point, such as replacing and deleting words or characters preceding or following the inserted transcript or words and characters at the ends of the transcript, in order for example to remove unintentionally repeated words or to fix punctuation. That is separate from the basic intended corrections process shown in FIG. 5.

It should be noted also that this intuitive dictation method does not preclude the use of other correction methods such as manually selecting a phrase and typing or dictating over it. Naturally, race conditions that may arise from using multiple input methods need to be managed, as they are in typical current dictation systems.

In some implementations, the system can utilize a deep neural network (DNN) model trained on auto-editing via dictation examples to estimate the user intent.

In one embodiment the deep neural network model is a multi-lingual end-to-end neural network model trained/fine-tuned to directly produce the second text from the audio representation of the utterance and a portion of the first text around the caret position.

In some implementations, the system can determine if a later part of the utterance is intended as a replacement of an earlier part of it using a deep neural network model, such as a transformer model, directly from the audio data of the utterance, without first transcribing the audio data to text. The model may be trained using audio examples, auto-generated with a text-to-speech system from text examples of common speech lapses and other corrections.

In some implementations the system can jointly transcribe and align the speech data of the utterance with the part of the existing text around the insertion point (caret position) using a deep neural network. The input to the neural network is the speech data and the text fragments to the left and right of the insertion point. The output is the total text fragment to replace the two fragments of the old text. This approach both informs the transcription of the utterance by adding context as well as informs the alignment by using the speech data. Some of the training data for the network can be auto-generated by using a speech recognizer to generate alternative transcripts of utterances and then generating examples from those of substituting a part of one alternative transcription for a differing part of another. Some of the training data part can be auto generated also by substituting phonetically similar phrases for phrases in existing text data. Similarly, with grammatically correct rephrasing.

In some implementations insertion and deletion scores can be affine beyond the first and last words, towards the middle of the match, to enable easy deletion or insertion of words without sacrificing discriminatory power. Also, for example, the deletion scores can be higher than average for end-of-sentence marks to avoid unintendedly replacing the tail of the last sentence with the head of the new sentence. Vowel-for-vowel substitution scores can be lower on average than vowel-for-consonant. Match scores for initial or ending characters can be higher to reduce risk of overextension. Insertion scores just before the start of a previous transcription can be lower to enable correcting for missed words by the speech recognizer.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A computer-implemented method comprising the steps of:
    presenting, by one or more computing devices, in a region of a display of a computing device, some first text, dictated or not;
    receiving, by the one or more computing devices, audio data of an utterance;
    executing, by the one or more computing devices, automated speech recognition (ASR) software to generate a transcription of the utterance;
    determining, by the one or more computing devices, whether to substitute a transcription of the utterance for a fragment of the first text that is not explicitly specified by the user, to insert into or append to the first text the transcription as new additional text or to perform another operation;
    responding to the determining whether to substitute the transcription of the utterance for a fragment of the first text that is not explicitly specified by the user, to insert into or append to the first text the transcription as new additional text, or to perform another operation, by presenting by the one or more computing devices, in the region of a display of a computing device, a second text, wherein the second text further comprises the transcription of the utterance either automatically substituted for the fragment of the first text, or else, inserted as additional text, or transformed into another modification of the first text, or no modification, wherein a portion of the second text around the substituted with or inserted transcription of the utterance, is optionally further adjusted for proper punctuation, word repetition, grammar and semantics, wherein the fragment of the first text to be replaced is optionally highlighted briefly prior to presenting the second text.

2. The method of claim 1, wherein determining whether to substitute the transcription of the utterance for a fragment of the first text that is not explicitly specified by the user, to insert into or append to the first text the transcription as new additional text or to perform another operation, further comprises determining explicitly or implicitly a likelihood that a transcription of the utterance is intended by a user as a replacement of the fragment of the first text and what the fragment is, and determining whether the likelihood satisfies an absolute or relative threshold level or a range.

3. The method of claim 2, wherein determining a likelihood that a transcription of the utterance is intended as a replacement of the fragment of the first text comprises aligning a transcription of the utterance and zero or more permutations of its terms with the first text and is based on the respective alignment scores, and on zero or more internal and external properties of the alignments, including the following: the length and position, in terms of characters, words, sentences or paragraphs, of the matching fragments of the transcription of the utterance and the first text; the context around a caret position, such as whether the caret is after an end-of-sentence mark; the type of characters and words in the aligned fragments; the alignment scores of sub-fragments of matched fragments; the semantic similarity of the matching fragments, possibly including adjacent and excluding end words, determined using a neural network model such as a multilingual deep neural network model with attention layers finetuned on a semantic similarity task.

4. The method of claim 3, wherein aligning a transcription of the utterance with the first text comprises aligning a transcription of the utterance with one or more parts of the first text using sequence alignment, such as global sequence alignment with start and end markers added to the transcription beforehand.

5. The method of claim 4, wherein the sequence alignment insertion, deletion, match and mismatch scores can vary based on one or more of the following: the value of the current, preceding and/or following characters, their character classes (word, non-word, punctuation, marker, etc.), their positions within the sequences, including relative to terms in the sequences, gap length, the language and domain of the utterance, the history of prior utterances and actions, and the application and device contexts.

6. The method of claim 5, wherein the transcription and the part of the first text to be aligned are further transcribed before aligning.

7. The method of claim 3, wherein the permutation of the transcription is generated by comparing the terms of the transcription with the terms of first text or part of it, including by global sequence aligning the terms of the transcription with the first text or part of it and taking into account the order of the matched terms in the first text.

8. The method of claim 3, wherein aligning a transcription of the utterance with a part the first text comprises aligning a transcription of the utterance with a part of the first text using a neural network alignment model.

9. The method of claim 1, further comprising the steps of: in response to receiving the audio data of the utterance, detecting by the one or more computing device whether the utterance is an "undo replacement" type voice command and in response to detecting such command, presenting a second text comprised of the text before the replacement, but with the transcription of the previous utterance inserted into it as additional text.

10. The method of claim 1, wherein determining, by the one or more computing devices, whether to substitute a transcription of the utterance for a fragment of the first text that is not explicitly specified by the user, to insert into or append to the first text the transcription as new additional text, or to perform another operation further comprises determining whether a part of the utterance is intended as a replacement of an earlier spoken part of it and in response to determining that it is, substituting the corresponding later part of the utterance transcription for the corresponding earlier part of it, wherein determining whether a part of the utterance is intended as a replacement of an earlier spoken part of it comprises one or both of the following: aligning at least one part of the utterance transcription with another part using sequence alignment and applying a set of regular expression replacement rules to the transcription of the utterance.

11. The method of claim 1, wherein generating a transcription of the utterance or determining, by the one or more computing devices, whether to substitute a transcription of the utterance for a fragment of the first text that is not explicitly specified by the user, to insert into or append to the first text the transcription as new additional text or to perform another operation further comprise determining whether a part of the utterance is intended as a replacement of an earlier spoken part of it and in response to determining that it is, substituting the corresponding later part of the utterance transcription for the corresponding earlier part of transcript, wherein determining whether a part of the utterance is intended as a replacement of an earlier spoken part of it comprises one or both of the following: aligning at least one part of the utterance transcription with another part using sequence alignment and applying a set of regular expression replacement rules to the transcription of the utterance.

12. The method of claim 1, wherein determining whether to substitute a transcription of the utterance for a fragment of the first text further comprises determining, by one or more computing devices, whether to substitute a transcription of the utterance for a fragment of the first text using a neural network model, configured to generate a fragment of the second text that includes the substituted with or inserted transcription of the utterance, based on the audio data of the utterance or its transcription and a portion of the first text around the caret position, such as such as multilingual transformer model, trained or finetuned on the task of editing via dictation using real and/or synthesized examples.

13. The method of claim 1, wherein adjusting a portion of the second text around the substituted with or inserted transcription of the utterance for proper punctuation, grammar and semantics comprises one or both of the following: processing by the one or more computing devices, that portion of the second text using a deep neural network model, such as a multilingual transformer model, fine-tuned for predicting punctuation; processing by the one or more computing devices, that portion of the second text using a set of regular expression replacement rules, with markers denoting the boundaries of the substituted with or inserted transcription of the utterance.

14. A system of intuitive dictation comprising:
one or more computers and one or more storage devices storing instruction that are operable, when executed by the one or more computers, to cause the one or more computers to perform operations, the operations further comprising:
presenting, by the one or more computing devices, in a region of a display of a computing device, some first text, dictated or not;
receiving, by the one or more computing devices, audio data of an utterance; and
executing, by the one or more computing devices, automated speech recognition (ASR) software to generate a transcription of the utterance;

determining, by the one or more computing devices, whether to substitute a transcription of the utterance for a fragment of the first text that is not explicitly specified by the user, to insert into or append to the first text the transcription as new additional text or to perform another operation;

responding to the determining whether to substitute the transcription of the utterance for a fragment of the first text that is not explicitly specified by the user, to insert into or append to the first text the transcription as new additional text, or to perform another operation, by presenting by the one or more computing devices, in the region of a display of a computing device, a second text, wherein the second text further comprises the transcription of the utterance either automatically substituted for the fragment of the first text, or else, inserted as additional text, or transformed into another modification of the first text, or no modification, wherein a portion of the second text around the substituted with or inserted transcription of the utterance, is optionally further adjusted for proper punctuation, word repetition, grammar and semantics, wherein the fragment of the first text to be replaced is optionally highlighted briefly prior to presenting the second text.

15. The system of claim 14, wherein determining whether to substitute the transcription of the utterance for a fragment of the first text that is not explicitly specified by the user, to insert into or append to the first text the transcription as new additional text or to perform another operation, further comprises determining explicitly or implicitly a likelihood that a transcription of the utterance is intended by a user as a replacement of the fragment of the first text and what the fragment is, and determining whether the likelihood satisfies an absolute or relative threshold level or a range.

16. The system of claim 15, wherein determining a likelihood that a transcription of the utterance is intended as a replacement of the fragment of the first text comprises aligning a transcription of the utterance and zero or more permutations of its terms with the first text and is based on the respective alignment scores, and on zero or more internal and external properties of the alignments, including the following: the length and position, in terms of characters, words, sentences or paragraphs, of the matching fragments of the transcription of the utterance and the first text; the context around a caret position, such as whether the caret is after an end-of-sentence mark; the type of characters and words in the aligned fragments; the alignment scores of sub-fragments of matched fragments; the semantic similarity of the matching fragments, possibly including adjacent and excluding end words, determined using a neural network model such as a multilingual deep neural network model with attention layers finetuned on a semantic similarity task.

17. The system of claim 16, wherein aligning a transcription of the utterance with the first text comprises aligning a transcription of the utterance with one or more parts of the first text using sequence alignment, such as global sequence alignment with start and end markers added to the transcription beforehand.

18. The system of claim 17, wherein the sequence alignment insertion, deletion, match and mismatch scores can vary based on one or more of the following: the value of the current, preceding and/or following characters, their character classes (word, non-word, punctuation, marker, etc.), their positions within the sequences, including relative to terms in the sequences, gap length, the language and domain of the utterance, the history of prior utterances and actions, and the application and device contexts.

19. The system of claim 18, wherein the transcription and the part of the first text to be aligned are further transcribed before aligning.

20. The system of claim 16, wherein the permutation of the transcription is generated by comparing the terms of the transcription with the terms of first text or part of it, including by global sequence aligning the terms of the transcription with the first text or part of it and taking into account the order of the matched terms in the first text.

21. The system of claim 16, wherein aligning a transcription of the utterance with a part the first text comprises aligning a transcription of the utterance with a part of the first text using a neural network alignment model.

22. The system of claim 14, further comprising the steps of: in response receiving the audio data of the utterance, detecting by the one or more computing device whether the utterance is an "undo replacement" type voice command and in response to detecting such command, presenting a second text comprised of the text before the replacement, but with the transcription of the previous utterance inserted into it as additional text.

23. The system of claim 14, wherein generating a transcription of the utterance or determining, by the one or more computing devices whether to substitute a transcription of the utterance for a fragment of the first text that is not explicitly specified by the user, to insert into or append to the first text the transcription as new additional text or to perform another operation further comprise determining whether a part of the utterance is intended as a replacement of an earlier spoken part of it and in response to determining that it is, substituting the corresponding later part of the utterance transcription for the corresponding earlier part of it, wherein determining whether a part of the utterance is intended as a replacement of an earlier spoken part of it comprises one or both of the following: aligning at least one part of the utterance transcription with another part using sequence alignment and applying a set of regular expression replacement rules to the transcription of the utterance.

24. The system of claim 14, wherein determining whether to substitute a transcription of the utterance for a fragment of the first text comprises determining, by one or more computing devices, whether to substitute a transcription of the utterance for a fragment of the first text using a neural network model, configured to generate a fragment of the second text that includes the substituted with or inserted transcription of the utterance, based on the audio data of the utterance or its transcription and a portion of the first text around the caret position, such as such as multilingual transformer model, trained or finetuned on the task of editing via dictation using real and/or synthesized examples.

25. The system of claim 14, wherein adjusting a portion of the second text around the substituted with or inserted transcription of the utterance for proper punctuation, grammar and semantics comprises one or both of the following: processing by the one or more computing devices, that portion of the second text using a deep neural network model, such as a multilingual transformer model, fine-tuned for predicting punctuation; processing by the one or more computing devices, that portion of the second text using a set of regular expression replacement rules, with markers denoting the boundaries of the substituted with or inserted transcription of the utterance.

\* \* \* \* \*